Patented June 11, 1940

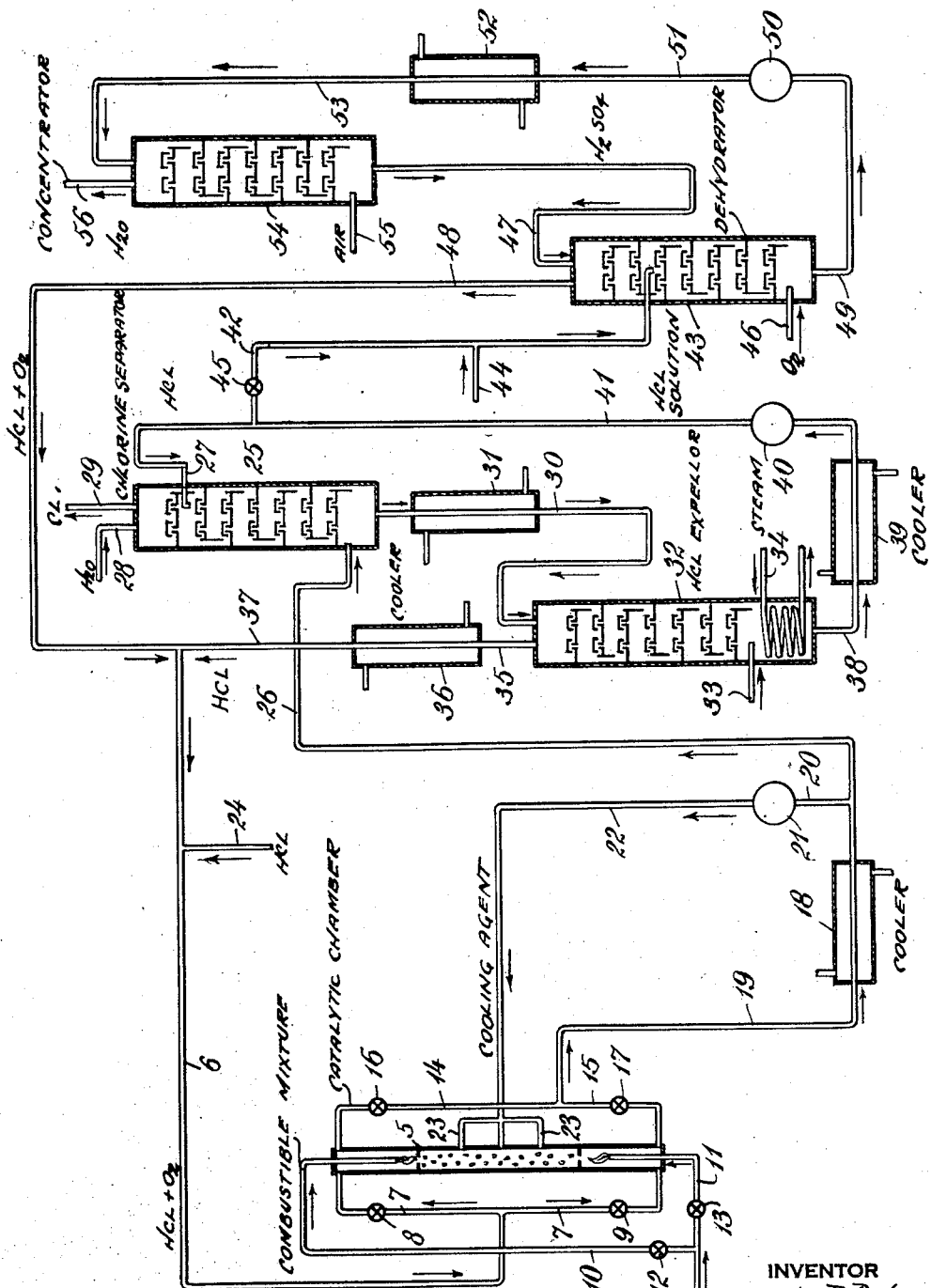

2,204,172

UNITED STATES PATENT OFFICE 2,204,172

METHOD OF PRODUCING CHLORINE

Frederick R. Balcar, Stamford, Conn., assignor to Air Reduction Company, Incorporated, New York, N. Y., a corporation of New York Application July 22, 1938, Serial No. 220,647

13 Claims. (Cl. 23—219)

This invention relates to the preparation of free chlorine from hydrogen chloride and particularly to improvements in the method of oxidizing hydrogen chloride, controlling the reaction and maintaining a continuous and cyclic operation to avoid losses and insure maximum recovery of the desired product.

The reaction involving the oxidation of hydrogen chloride has long been known and was utilized in the so-called "Deacon process." This process however, even with improvements, has never been satisfactory for the commercial production of chlorine. In fact, for many years practically all commercial chlorine has been obtained principally by electrolysis of salt solutions such as aqueous solutions of sodium or potassium chloride. While the electrolytic process is successful and will produce chlorine at reasonable costs, it has the disadvantage that caustic soda or potash are unavoidable by-products. Where there is little or no use for caustic soda or potash, the electrolytic process cannot be operated advantageously.

In processes hitherto employed for the oxidation of hydrogen chloride by admixture with air and contacting with a catalyst such as compounds of copper it has been impossible to maintain the catalyst body in a sufficiently active state for more than a short period of time. This was due to the fact that the copper chloride, being somewhat volatile at the temperatures employed was vaporized and driven out of the catalyst chamber by the flow of gases.

Also in processes hitherto employed it has been the practice to use massive catalyst chambers which were heated and cooled indirectly through thick walls, thus necessitating long periods of time for starting and stopping operations.

It is the object of the present invention to provide a satisfactory and economical method of oxidizing hydrogen chloride to produce chlorine and to control the reaction, thus avoiding difficulties which were experienced in the Deacon process.

Another object of the invention is to afford a method whereby substantially all of the hydrogen chloride entering the system is oxidized to produce free chlorine.

A further object of the invention is the provision of a method in which water resulting from oxidation of hydrogen chloride is eliminated from the system as formed, thereby preventing the accumulation of water with the resulting dilution and eventual choking of the system.

It is a further object of this invention to provide a method wherein the catalyst remains highly active and efficient over long periods of time.

It is a further object of the present invention to provide direct internal heat in a catalytic chamber which will allow quick heating and cooling without contamination of the product.

It is a further object of the present invention to provide for the utilization of all of the hydrogen chloride entering the system by recovering the major portion of the unconverted hydrogen chloride in substantially dry form without resorting to the usual costly practice of drying the gas with sulfuric acid, calcium chloride, etc., and returning it mixed with oxygen to the reaction chamber.

Another object of the invention is to meet the continually increasing demand for larger quantities of chlorine without a corresponding production of caustic.

Other objects and advantages of the invention will be apparent as it is better understood by reference to the following specification and accompanying drawing, which illustrates diagrammatically the various essential parts of the apparatus, it being understood the details which form no part of the invention are omitted for the purpose of clarity.

In carrying out the invention, I employ a catalyst disposed in a suitable chamber to which a mixture of hydrogen chloride and oxygen in proportions determined as hereinafter described is fed uniformly. As a catalyst I prefer to employ the composition described in the application of Hoke S. Miller, Serial No. 211,521, filed June 3, 1938. As described in that application, the catalyst consists of a compound of copper to which has been added a compound of one or more of the group of metals commonly known as the rare earth group, or a compound of uranium. By "rare earth group," I mean the metals commonly known as rare earth metals and including the following: scandium, cerium, lanthanum, praseodymium, neodymium, illinium, samarium, thorium, europium, gadolinium, terbium, yttrium, dysprosium, holmium, erbium, thulium, ytterbium, lutecium and zirconium.

The rare earth material may be added to the copper compound as a pure material, or it may be added as a mixture of rare earth compounds. For example, a compound of thorium or lanthanum may be added to the copper compound, or a mixture of cerium and thorium compounds may be used advantageously. In general, I prefer to use a mixture of rare earth compounds and associated materials ordinarily obtained from monazite sand, samarskite and other minerals, or the mixture of these materials remaining after the commercial extraction of one or more of the components such as thorium or cerium.

The composition of the catalytic material may be varied within rather wide limits. Good results may be obtained when the amount of copper compound present is such that the catalyst contains a fraction of 1% by weight of copper, or the copper content of the catalyst may be increased to 25% by weight or more. The amount of rare earth material added may be varied from a fraction of 1% by weight to 90% by weight or more if desired.

In general I prefer to use 1 to 5% by weight of copper and 10 to 60% by weight of one or more of the rare earth materials previously described. I prefer to impregnate a suitable support, such as pumice, silica gel, diatomaceous earth, fire clay and the like, with a mixture of the copper compound and the rare earth compounds, although a supporting material is not absolutely necessary.

While the preferred catalyst is a compound such as I have described, such a catalyst is not essential to the operation of the method. I may employ a suitable copper compound such as copper chloride or any other catalyst which is capable of effecting the desired reaction. Copper chloride is known to be a catalyst for the desired reaction and was originally suggested as the catalyst for the Deacon process. The method as hereinafter described permits the utilization of such a catalyst without the disadvantages and losses which were incidental to the Deacon process.

The catalyst may be prepared in a variety of ways such as by precipitation of the metals as the hydroxides on a suitable supporting material such as pumice, silica gel, diatomaceous earth, fire clay or other porous material which will withstand the effect of elevated temperatures and exposure to chlorine, hydrogen chloride, oxygen and steam. An alternative method is to soak the supporting material in a solution of salts of the appropriate metals, for example, the chlorides, sulphates or nitrates of the metals, with subsequent addition, with stirring, of water, or a solution of ammonia, sodium or potassium hydroxides, or other alkaline solution, after which the resulting mixture is dried and heated to the reaction temperature before use.

The catalyst may be prepared also by precipitating the metals as hydroxides with sodium or potassium hydroxide as the precipitating agent, or the oxides or other materials desired as the catalyst may be thoroughly mixed and pressed into pellets for use.

The selected catalyst as thus prepared is disposed in a suitable chamber 5. The chamber may be constructed of any suitable material resistant to the corrosive effect of the vapors and the temperature attained. The mixture of hydrogen chloride and oxygen in the proportions hereinafter described is introduced to either end of the chamber 5 through pipe 6 having branches 7. Valves 8 and 9 permit direction of the entering gas mixture to the opposite ends of the catalyst chamber to permit reversal of the flow for the purpose hereinafter more fully explained. In order to initiate the reaction by heating the entering gaseous mixture to a temperature of approximately 350° C., suitable flames are maintained at the entering end of the catalyst chamber by supplying any suitable fuel and oxygen through pipes 10 and 11. Preferably a gaseous fuel is employed and valves 12 and 13 are provided to permit control of the flames. If hydrogen be employed for this purpose, there will be no contamination of the product, the water being formed being eliminated by the method hereinafter described. This is particularly advantageous where the highest concentration of chlorine is desired. The gaseous reaction mixture thus heated to the required temperature enters the catalyst body and reacts. The resulting products of reaction escape through pipes 14 or 15 controlled by valves 16 and 17 depending upon the direction of flow of the gaseous mixture through the catalyst body.

Copper chloride volatilizes at the temperature of the reaction and will escape from that portion of the catalyst where the temperature is highest, and in the manner hereinafter described will be condensed in another portion of the catalyst. Upon reversal of the operation, the same result will follow and the copper compound will again be condensed and none of the copper will be permitted to leave the catalyst body. To effect condensation of volatilized material, cooling of the catalyst body beyond the zone of highest temperature where the reaction is most vigorous is accomplished by the introduction of a portion of the products of the reaction which are cooled for this purpose.

While the temperature of the gases in the reaction zone may be varied within wide limits, it is necessary that the temperature of the gases before leaving the catalyst be reduced to a temperature lower than about 550 to 450° C. and preferably to about 400 to 200 or even lower to effect condensation of the copper volatilized in the reaction zone. In order to accomplish this on a large scale by indirect cooling of the catalyst or by radiation, an enormous surface for heat transfer would be necessary. This would add greatly to the cost of the operation and would be the source of many operating difficulties. The recycling of a portion of the cooled reaction products, and mixing it within the catalyst chamber with gases leaving the reaction zone, however, provides a means of withdrawing heat from the gases by direct contact therewith. In this manner, the volatile portion of the catalyst is condensed and re-deposited within the body of the catalyst in a most efficient and economical manner.

The amount of cooling gas required will in general depend upon the maximum temperature attained in the reaction zone. This maximum temperature in turn depends upon the ratio in which oxygen and hydrogen chloride enter the reaction chamber, and the extent to which the reaction has progressed. In general, I have found that good results may be obtained when the volume of total gas leaving the catalyst chamber is greater than 20 cu. ft. of gas, measured under standard conditions, per pound of chlorine produced therein. Even greater volumes of total gas may be used to obtain good results, in which case the temperature of the gases leaving the catalyst will thereby be reduced still further, and more complete condensation of the volatile portion of the catalyst will result. I have obtained good results using 30 to 40 cu. ft. of exit gas per lb. of chlorine produced. I prefer, however, to use about 80 to 100 cu. ft. exit gas per lb. of chlorine, although I may use as much as 200 cu. ft. or even more of exit gas per lb. of chlorine produced.

When the operation is carried out in this manner, it is immaterial whether oxygen or hydrogen chloride is originally present in excess. Furthermore the ratio of cooling gas to the gas entering the reaction zone may be varied widely since the temperature attained in the reaction zone will depend upon the volume of gas entering the reaction zone per unit weight of chlorine produced therein.

If desired, a portion of the gas leaving the catalyst chamber may, after cooling, be used as heretofore described to condense the volatilized catalyst or by mixing with the incoming feed gases, serve to control the reaction temperature and thus prevent volatilization of the catalyst without adding any undesirable constituent which might at the same time contaminate the product. However, other gases may be used for this purpose if their presence in the finished product is not objectionable.

To cool the catalyst as described, a cooler 18 is disposed in the pipe 19 through which the products of reaction escape. A branch pipe 20 is connected to a pump 21 and delivers the cooled products through a pipe 22 to approximately the middle portion of the catalyst chamber. If desired, the cool gaseous products may enter the catalyst chamber at a plurality of points as indicated by the branches 23 connected to the pipe 22. The cooled gaseous mixture thus entering the catalyst chamber reduces the temperature of the products of reaction within the chamber immediately, and causes the condensation of any volatilized material within the catalyst body. Thus, as hereinafter indicated, upon reversal of the reaction, the volatilized material is still available in the catalyst to effect the reaction.

A portion of the hydrogen chloride and oxygen forming the gaseous mixture which enters the reaction chamber is a product of separations effected in the manner hereinafter described. Additional hydrogen chloride in the gaseous mixture formed is introduced through a pipe 24. It is necessary to effect the desired control of the operation. This control is obtained by regulating the proportions of hydrogen chloride and oxygen in the mixture. If the proportions indicated by stoichiometric relations as shown by the reaction equation

$$4HCl + O_2 = 2Cl_2 + 2H_2O$$

were employed, the temperature attained by the reaction would be much too high. Consequently the proportions are such as to ensure a temperature of from about 425 to 600° C. as a maximum. While I prefer to operate with a reaction temperature in the vicinity of 425 to 600° C., I have obtained good results at temperatures as low as 300 to 350° C., and also at temperatures as high as 600 to 800° C., and higher. The temperature control may be accomplished by using either an excess of hydrogen chloride or an excess of oxygen. The former relation is preferred where pure chlorine is desired. The latter relation produces chlorine diluted with oxygen which may be desirable in certain cases where the chlorine can be utilized in this form and the oxygen recovered for re-use. The preferred proportions are thus illustrated in terms of flow, for example, 40 cu. ft. per hour of hydrogen chloride used to 3 cu. ft. of oxygen per hour. Alternatively it would be practical to employ 30 cu. ft. of oxygen and approximately 12 cu. ft. per hour of hydrogen chloride. It will be understood that these ratios are not fixed but are those well adapted to result in the desired reaction temperature in the catalyst body. The ratios may be varied within relatively wide limits but to avoid excessive temperatures, the reaction is best conducted with ratios other than that indicated by stoichiometric proportions.

Having effected the reaction to produce chlorine, the next step in the operation involves the separation of the chlorine from unreacted hydrogen chloride and water vapor resulting from the oxidation of hydrogen in the reaction chamber. For this purpose, I provide an absorber 25 consisting of a tower containing suitable trays or rings or other means to insure adequate contact of the vapors with the liquid supplied for absorption. The gaseous mixture is introduced near the bottom of the tower through pipe 26. Near the top of the tower a solution of approximately 25% hydrochloric acid is introduced through a pipe 27. A small amount of water as reflux may be introduced through a pipe 28 at the top of the tower. The liquids descending through the tower extract substantially all of the hydrogen chloride remaining in the gaseous mixture, and chlorine in substantially pure condition escapes through pipe 29. In the event that there is an excess of oxygen in the system, oxygen will also escape with the chlorine through the pipe 29. It is possible also to employ air as the oxidizing agent in place of oxygen, in which event nitrogen will appear as a contaminating agent in the chlorine produced and any nitrogen will also escape through the pipe 29 with the chlorine. For many purposes, chlorine diluted with nitrogen may be utilized and the reaction may be conducted with air as the oxidizing agent at somewhat less expense than where oxygen must be supplied.

The hydrogen chloride from the tower 25 escapes through a pipe 30 which may be provided with a heater 31 supplied with steam or other suitable heating agent to raise the temperature of the liquid. The pipe 30 delivers the hydrogen chloride to an expeller 32 consisting of a tower with trays, rings or other means to effect adequate contact of the liquid with oxygen supplied at the bottom of the tower through a pipe 33. A heating coil 34 supplied with steam or other suitable heating agent is disposed in the bottom of the tower to raise the temperature of the liquid. In traveling through the tower, the hydrogen chloride is released from the liquid and escapes through a pipe 35 into a reflux cooler 36 which condenses substantially all the water present in the vapor. Thus the hydrogen chloride with the oxygen supplied through the pipe 33 is delivered through the pipe 37 to the inlet pipe 6. The weak hydrogen chloride solution descending through the tower 32 escapes through a pipe 38, passes through a cooler 39 and is delivered by a pump 40 through pipes 41 and 27 to a point near the top of the column 25.

As hereinbefore indicated, water is formed by the initial reaction and if permitted to remain in the system would eventually dilute the products to a point where the method could no longer be maintained in operation. To eliminate this water, a part of the hydrogen chloride solution is withdrawn from the pipe 41 through a pipe 42 having a control valve 45 and is delivered to a dehydrater 43.

Instead of feeding dry hydrogen chloride gas through the pipe 24, an aqueous solution of hydrogen chloride may be introduced through the pipe 44 into the pipe 42. Entering the dehydrater 43 which consists of a tower having trays, rings or other means to increase the surface extension of the liquid, the liquid flows downwardly countercurrent to a stream of oxygen introduced through a pipe 46. Strong sulphuric acid is introduced through a pipe 47 at the top of the dehydrater. Contact between the sulphuric acid and hydrogen chloride solutions results in the removal of water from the hydrogen chloride, and the resulting gaseous hydrogen chloride with the oxygen supplied is delivered through a pipe 48, which is connected to the feed pipe 6, thus completing the cycle necessary to maintain the feed of hydrogen chloride and oxygen to the catalyst chamber.

The sulphuric acid escapes from the bottom of the dehydrator through a pipe 49 and is delivered through a pump 50 and pipe 51 to a heater 52 supplied with steam or other suitable heating agent. The heated sulphuric acid solution is then delivered through a pipe 53 to the top of concentrater 54 consisting of a tower with trays, rings or other means to extend the surface of the liquid. Air is introduced to the bottom of the concentrater 54 through a pipe 55 and passing up through the acid removes water vapor therefrom. The water vapor thus separated represents the water introduced by the reaction which is thus delivered from the system through a pipe 56. In addition to water produced in the system, surplus water introduced at any point, as for example, in employing an aqueous solution of hydrogen chloride as a feed, or reflux water that may be added through pipe 28 to prevent escape of any hydrogen chloride, may also be eliminated through the pipe 56.

It will be understood that in feeding the hydrogen chloride and oxygen at various points in the system, the amounts supplied must be such that when all the feed is combined in pipe 6, the proportions of hydrogen chloride and oxygen will be those selected in order to maintain the reaction and limit the temperature in the catalyst chamber as hereinbefore specified. Consequently all of the feed must be regulated. This however is readily accomplished even though the materials entering the reaction are supplied at a variety of points, and some of the materials are thus recovered in the various steps described and returned for reuse in the cyclic operation. Various meters and other measuring devices (not shown) will be installed in the system at the necessary points to permit the control of the material supplied and thus maintain the balance of the operation.

The method of maintaining the reaction with a relatively low temperature in the catalyst body and particularly the cooling of a portion of the catalyst body to insure condensation of any volatilized catalyst material permits the effective operation of the method and particularly the maintenance of the catalyst body at maximum efficiency over long periods. Substantially none of the effective catalyst material is lost through volatilization, and consequently by reversing the direction of flow of the gaseous mixture from time to time as may be expedient, the catalyst body always remains in active condition and reaction proceeds with maximum efficiency to produce chlorine, which is the desired product. Owing to the provision for separating and recovering the hydrogen chloride, substantially none of the feed is lost, and the cost of the operation is correspondingly reduced.

The other essential element of the method is the separation of the excess water which is removed in the necessary proportions to prevent the otherwise unavoidable dilution of the liquids in the system. These several improvements insure the practical and commercial production of chlorine by the oxidation of hydrogen chloride.

The practical results secured by the operation are set forth in detail with numerous examples in the application of Hoke S. Miller hereinbefore identified.

There are many processes involving the use of chlorine in which more or less of the chlorine entering the system finally appears as hydrogen chloride. This hydrogen chloride in many cases becomes a more or less useless by-product and oftentimes presents a problem of disposition. The present method may be employed to utilize economically the hydrogen chloride produced in this way.

In certain processes for the manufacture of pulp for paper, and especially kraft paper, two important materials are sodium sulphate and chlorine. The treatment of salt with sulphuric acid produces sodium sulphate and hydrogen chloride. The latter can readily be converted into chlorine by the present invention, thus providing a simple and economical method for the production of these two important raw materials without the simultaneous production of any undesirable by-products.

The term "oxygen" in the accompanying claims includes oxygen-containing gases.

Various changes may be made in the procedure and particularly in the apparatus employed in carrying out the method without departing from the invention or sacrificing its advantages.

I claim:

1. The method of producing chlorine by oxidation of hydrogen chloride which comprises introducing a gaseous mixture of hydrogen chloride and oxygen into a body of a catalyst capable of promoting the reaction and volatile at elevated temperatures, in proportions such as to avoid excessive temperatures resulting from the reaction, and cooling the catalyst body beyond the zone of initial reaction to a temperature at which catalyst volatilized during the reaction will condense therein by introducing cooled reaction products to the catalyst.

2. The method of producing chlorine by oxidation of hydrogen chloride which comprises initially heating a gaseous mixture of hydrogen chloride and oxygen by contact with a flame, introducing the gaseous mixture into a body of a catalyst capable of promoting the reaction and volatile at elevated temperatures, in proportions such as to avoid excessive temperatures resulting from the reaction, and cooling the catalyst body beyond the zone of initial reaction to a temperature at which catalyst volatized during the reaction will condense therein by introducing cooled reaction products therein.

3. The method of producing chlorine by oxidation of hydrogen chloride which comprises initially heating a gaseous mixture of hydrogen chloride and oxygen by contact with a flame, introducing the gaseous mixture into a body of a catalyst capable of promoting the reaction and volatile at elevated temperature, in proportions such as to avoid excessive temperatures resulting from the reaction, cooling the catalyst body beyond the zone of initial reaction to a temperature at which catalyst volatilized during the reaction will condense therein, and periodically reversing the direction of flow of the gaseous mixture through the catalyst body.

4. The method of producing chlorine by oxidation of hydrogen chloride which comprises initially heating a gaseous mixture of hydrogen chloride and oxygen by contact with a flame, delivering the gaseous mixture to a catalyst capable of promoting the reaction in proportions such as to avoid excessive temperatures resulting from the reaction, separating chlorine from the reaction products, separating unreacted hydrogen chloride from the residue and returning it to the catalyst, and rejecting the water formed and introduced during the operation.

5. The method of producing chlorine by oxidation of hydrogen chloride which comprises initially heating a gaseous mixture of hydrogen chloride and oxygen by contact with a flame, delivering the gaseous mixture to a catalyst capable of promoting the reaction in proportions such as to avoid excessive temperatures above 800° C. resulting from the reaction, separating chlorine from the reaction products, separating unreacted hydrogen chloride from the residue and returning it to the catalyst, and rejecting the water formed and introduced during the operation.

6. The method of producing chlorine by oxidation of hydrogen chloride which comprises initially heating a gaseous mixture of hydrogen chloride and oxygen by contact with a flame, introducing the gaseous mixture into a body of a catalyst capable of promoting the reaction and volatile at elevated temperatures, in proportions such as to avoid excessive temperatures resulting from the reaction, cooling the catalyst body beyond the zone of initial reaction to a temperature at which catalyst volatilized during the reaction will condense therein, separating chlorine from the reaction products, separating unreacted hydrogen chloride from the residue and returning it to the catalyst body, and rejecting the water formed and introduced during the operation.

7. The method of producing chlorine by oxidation of hydrogen chloride which comprises initially heating a gaseous mixture of hydrogen chloride and oxygen by contact with a flame, introducing the gaseous mixture into a body of a catalyst capable of promoting the reaction and volatile at elevated temperatures, in proportions such as to avoid excessive temperatures resulting from the reaction, cooling the catalyst body beyond the zone of initial reaction to a temperature at which catalyst volatilized during the reaction will condense therein by introducing cooled reaction products therein, separating chlorine from the reaction products, separating unreacted hydrogen chloride from the residue and returning it to the catalyst body, and rejecting the water formed and introduced during the operation.

8. The method of producing chlorine by oxidation of hydrogen chloride which comprises initially heating a gaseous mixture of hydrogen chloride and oxygen by contact with a flame, introducing the gaseous mixture into a body of a catalyst capable of promoting the reaction and volatile at elevated temperatures, in proportions such as to avoid excessive temperatures resulting from the reaction, cooling the catalyst body beyond the zone of initial reaction to a temperature at which catalyst volatilized during the reaction will condense therein, periodically reversing the direction of flow of the gaseous mixture through the catalyst body, separating chlorine from the reaction products, separating unreacted hydrogen chloride from the residue and returning it to the catalyst body, and rejecting the water formed and introduced during the operation.

9. The method of producing chlorine by oxidation of hydrogen chloride which comprises introducing a gaseous mixture of hydrogen chloride and oxygen to a catalyst capable of promoting the reaction in proportions such as to avoid excessive temperatures resulting from the reaction, passing the products of the reaction through a solution of hydrochloric acid to separate water and unreacted hydrogen chloride therefrom, with resulting separation of chlorine, separating hydrogen chloride from the resulting hydrochloric acid solution and returning it to the catalyst, treating a part of the remaining solution of hydrochloric acid to remove water, passing the resulting gaseous hydrogen chloride back to the catalyst for reaction with oxygen, and returning the remainder of the solution of hydrochloric acid for separation of water and hydrogen chloride from reaction products.

10. The method of producing chlorine by oxidation of hydrogen chloride which comprises introducing a gaseous mixture of hydrogen chloride and oxygen to a catalyst capable of promoting the reaction in proportions such as to avoid excessive temperatures above 800° C. resulting from the reaction, passing the products of the reaction through a solution of hydrochloric acid to separate water and unreacted hydrogen chloride therefrom, with resulting separation of chlorine, separating hydrogen chloride from the resulting hydrochloric acid solution and returning it to the catalyst, treating a part of the remaining solution of hydrochloric acid to remove water, passing the resulting gaseous hydrogen chloride back to the catalyst for reaction with oxygen, and returning the remainder of the solution of hydrochloric acid for separation of water and hydrogen chloride from reaction products.

11. The method of producing chlorine by oxidation of hydrogen chloride which comprises introducing a gaseous mixture of hydrogen chloride and oxygen to a catalyst capable of promoting the reaction in proportions such as to avoid excessive temperatures resulting from the reaction, cooling the catalyst beyond the zone of initial reaction, passing the products of the reaction through a solution of hydrochloric acid to separate water and unreacted hydrogen chloride therefrom, with resulting separation of chlorine, separating hydrogen chloride from the resulting hydrochloric acid solution and returning it to the catalyst, treating a part of the remaining solution of hydrochloric acid to remove water, passing the resulting gaseous hydrogen chloride back to the catalyst for reaction with oxygen, and returning the remainder of the solution of hydrochloric acid for separation of water and hydrogen chloride from reaction products.

12. The method of producing chlorine by oxidation of hydrogen chloride which comprises introducing a gaseous mixture of hydrogen chloride and oxygen to a catalyst capable of promoting the reaction in proportions such as to avoid excessive temperatures resulting from the reaction, cooling the catalyst beyond the zone of initial reaction by introducing therein cooled reaction products, passing the products of the reaction through a solution of hydrochloric acid to separate water and unreacted hydrogen chloride therefrom, with resulting separation of chlorine, separating hydrogen chloride from the resulting hydrochloric acid solution and returning it to the catalyst, treating a part of the remaining solution of hydrochloric acid to remove water, passing the resulting gaseous hydrogen chloride back to the catalyst for reaction with oxygen, and returning the remainder of the solution of hydrochloric acid for separation of water and hydrogen chloride from reaction products.

13. The method of producing chlorine by oxidation of hydrogen chloride which comprises introducing a gaseous mixture of hydrogen chloride and oxygen to a catalyst capable of promoting the reaction in proportions such as to avoid excessive temperatures resulting from the reaction, cooling the catalyst beyond the zone of initial reaction, periodically reversing the direction of flow of the gaseous mixture through the catalyst, passing the products of the reaction through a solution of hydrochloric acid to separate water and unreacted hydrogen chloride therefrom, with resulting separation of chlorine, separating hydrogen chloride from the resulting hydrochloric acid solution and returning it to the catalyst, treating a part of the remaining solution of hydrochloric acid to remove water, passing the resulting gaseous hydrogen chloride back to the catalyst for reaction with oxygen, and returning the remainder of the solution of hydrochloric acid for separation of water and hydrogen chloride from reaction products.

FREDERICK R. BALCAR.